United States Patent
Han et al.

(10) Patent No.: US 10,865,693 B2
(45) Date of Patent: Dec. 15, 2020

(54) COOLING MODULE

(71) Applicant: Hanon Systems, Daejeon (KR)

(72) Inventors: Ji Hun Han, Daejeon (KR); Gwang Ok Ko, Daejeon (KR); Seok Jong Yoo, Daejeon (KR)

(73) Assignee: Hanon Systems, Daejeon (KR)

( * ) Notice: Subject to any disclaimer, the term of this patent is extended or adjusted under 35 U.S.C. 154(b) by 145 days.

(21) Appl. No.: 15/894,554

(22) Filed: Feb. 12, 2018

(65) Prior Publication Data

US 2018/0347446 A1    Dec. 6, 2018

(30) Foreign Application Priority Data

May 31, 2017   (KR) .................. 10-2017-0067529

(51) Int. Cl.
| | | |
|---|---|---|
| *F01P 7/02* | (2006.01) | |
| *F01P 11/10* | (2006.01) | |
| *F01P 3/12* | (2006.01) | |
| *F01P 3/18* | (2006.01) | |
| *B60K 11/04* | (2006.01) | |

(52) U.S. Cl.
CPC .............. *F01P 7/02* (2013.01); *B60K 11/04* (2013.01); *F01P 3/12* (2013.01); *F01P 3/18* (2013.01); *F01P 11/10* (2013.01); *F01P 2003/182* (2013.01); *F01P 2060/02* (2013.01)

(58) Field of Classification Search
CPC .. F01P 3/205; F01P 11/0276; F01P 2011/065; F01P 7/02; F01P 11/02; F01P 2003/182; F28F 2265/06; F28F 2265/22
See application file for complete search history.

(56) References Cited

U.S. PATENT DOCUMENTS

| | | | | | |
|---|---|---|---|---|---|
| 4,612,977 A | * | 9/1986 | Hayashi | ................ | B60K 11/04 165/71 |
| 6,041,744 A | * | 3/2000 | Oota | ........................ | F01P 5/06 123/41.14 |
| 6,167,946 B1 | * | 1/2001 | Uchikawa | ............... | F28F 9/002 123/41.14 |
| 6,487,867 B1 | * | 12/2002 | Herren | ..................... | B08B 9/08 62/126 |
| 8,936,128 B2 | * | 1/2015 | Numa | ................... | F01N 3/2066 180/69.25 |
| 2009/0159239 A1 | * | 6/2009 | Desai | .................... | F16K 5/0414 165/71 |
| 2016/0001629 A1 | * | 1/2016 | Rohr | ..................... | B60K 11/04 165/76 |

FOREIGN PATENT DOCUMENTS

| | | | | |
|---|---|---|---|---|
| GB | 2449898 A | * | 12/2008 | ........... F24D 19/088 |
| JP | H0988584 A | | 3/1997 | |
| JP | 2003127904 A | * | 5/2003 | |
| KR | 1020110075195 A | | 7/2011 | |
| KR | 20120067020 A | | 6/2012 | |

* cited by examiner

Primary Examiner — Jon T. Schermerhorn, Jr.
(74) Attorney, Agent, or Firm — Norton Rose Fulbright US LLP; James R. Crawford

(57) ABSTRACT

Provided is a cooling module, and more particularly, a cooling module configured to include a condenser, an intercooler, and at least one radiator, and discharge a heat exchange medium by changing a shape of peripheral components without configuring separate components such as a separate hose when the heat exchange medium inside a radiator disposed on an upper part of the intercooler is discharged.

11 Claims, 6 Drawing Sheets

COOLING MODULE

CROSS-REFERENCE TO RELATED APPLICATIONS

This application claims priority under 35 U.S.C. § 119 to Korean Patent Application No. 10-2017-0067529, filed on May 31, 2017, in the Korean Intellectual Property Office, the disclosure of which is incorporated herein by reference in its entirety.

TECHNICAL FIELD

The following disclosure relates to a cooling module, and more particularly, to a cooling module configured to include a condenser, an intercooler, and at least one radiator, and discharge a heat exchange medium by changing a shape of peripheral components without configuring separate components such as a separate hose when the heat exchange medium inside a radiator disposed on an upper part of an intercooler is discharged.

BACKGROUND

Generally, a cooling module for a vehicle is formed by modularizing a radiator, a condenser, and a fan shroud. Depending on application models, an intercooler may be further installed on a lower part of the radiator and the condenser. In the case of a hybrid electronic vehicle or a fuel cell vehicle, in addition to the components, an electric radiator is also installed to cool the electric components.

Meanwhile, in the hybrid vehicle, electronic components which are electric and electronic components including a motor, an inverter, a battery stack, and the like in addition to the engine need to be cooled, and therefore coolant passing through the engine and coolant passing through the electronic components have a predetermined difference in temperature. As the result, the vehicle does not have a single cooling system.

Therefore, a cooling system for a vehicle largely includes a cooling system for an engine and a cooling system for electric components separately, and the radiator for cooling the engine and the radiator for cooling the electric components are separately provided.

As the related technology, Korean Patent Laid-Open Publication No. 10-2011-0075195 (publication date: Jul. 6, 2011, entitled: Cooling Module) has been disclosed.

As illustrated in FIG. 1, a drain portion 4 is provided in a header tank 3 to exchange coolant flowing into the radiator 2 or to discharge foreign materials or the like in the radiator 2. One end of a drain hose 5 having a sufficient length is connected to the drain portion 4 and the other end of the drain hose 5 is disposed at a position where coolant is discharged while avoiding the cooling module or a bumper of the vehicle.

The existing coolant discharge structure should include a separate drain hose to discharge the coolant, which increases material costs and requires additional working time for mounting.

Therefore, there is a need for a method for saving cost and working time and aesthetically forming the whole package by implementing a shape in which coolant may be recovered to a lower part of a vehicle by changing a shape of peripheral components without configuring separate components for discharging the coolant.

SUMMARY

An embodiment of the present invention is directed to providing a cooling module configured to discharge a heat exchange medium to a lower part of a vehicle without configuring separate components such as a separate hose by mounting a drain portion on an outside of a header tank of an intercooler when the heat exchange medium inside a radiator disposed on an upper part of the intercooler is discharged.

In one general, aspect, a cooling module includes: a condenser disposed at a front part of a vehicle and condensing a refrigerant flowing into an air conditioner system for the vehicle; a radiator disposed at a rear part of the condenser, having a first heat exchange medium flowing therein, and including a first or second header tank; and an intercooler disposed at a lower part of the condenser and the second radiator and including a third header tank formed at a position corresponding to the first or second header tank, wherein the first or second header tank includes a first drain portion formed at a lower part of the first or second header tank so that a heat exchange medium is discharged to the lower part of the first or second header tank, and the third header tank has an outer side provided with a channel so that the heat exchange medium introduced through the first drain portion is discharged to the lower part.

The radiator may include: a first radiator R disposed at a rear part of the condenser C, having a first heat exchange medium flowing therein, and including a 1-1-th header tank 21 provided at one side in a longitudinal direction thereof; and a second radiator L disposed between the condenser C and the first radiator R, having a second heat exchange medium flowing therein, and including a 2-1-th header tank 31 provided at one side in a longitudinal direction thereof, and the first drain portion 50 is disposed at one side of a lower part of the 2-1-th header tank 31 so that the second heat exchange medium is discharged to the lower part of the 2-1-th header tank 31, and the channel discharges the second heat exchange medium discharged from the 2-1-th header tank 31 to the lower part.

The channel may include: a second drain portion 60 discharging the second heat exchange medium discharged from the 2-1-th header tank 31 to the lower part; and a third drain portion 70 protruding to a side part from one side of the lower part of the 1-1-th header tank 21 and formed to discharge the second heat exchange medium introduced through the second drain portion 60 to the lower part.

The first drain portion 50 may include a first outlet portion 51 that extends down to form a channel through which the second heat exchange medium is discharged and a control member 52 that controls a flow rate of the second heat exchange medium to the first outlet portion 51.

The second drain portion 60 may include: an upper guide 61 disposed at an upper part of the 3-1-th header tank 41 and including an upper rib 62 that protrudes upwardly in directions other than a rear part so that the second heat exchange medium introduced from above flows into the rear part; a side guide 65 including the side rib 64 protruding from both sides of a side of a rear part of the 3-1-th header tank 41 so that the second heat exchange medium flowing out from the rear part of the upper guide 61 flows down vertically along the side of the rear part of the 3-1-th heater tank 41; and a lower guide 68 extending to a third drain portion 70 while protruding backward from the lower part of the side guide 65 and having lower ribs 67 provided at both sides thereof while protruding upwardly to move the second heat exchange medium flowing down from the side guide 65 to the third drain portion 70.

The upper guide 61 may further include an inclined part 63 positioned under the first outlet portion 51 of the first drain portion 50 and formed to be inclined by a predetermined angle to the upper surface of the 3-1-th header tank 41 to collide with the second heat exchange medium introduced from above to guide the second heat exchange medium backwardly.

Ribs may be continuously provided at a part where the upper rib 62 and the side rib 64 may meet each other and ribs may be continuously provided at a part where the side rib 64 and the lower rib 67 may meet each other.

The third drain portion 70 may include: a cylindrical inlet portion 71 having an opened upper part so that the second heat exchange medium is introduced from the lower guide 68; and an outlet portion 72 having opened upper and lower parts and formed to correspond to a hole provided on a lower surface of the inlet portion 71 to discharge the second heat exchange medium downwardly.

In another general, aspect, a cooling module includes: a condenser C disposed at a front part of a vehicle and condensing a refrigerant flowing into an air conditioner system for the vehicle; a second radiator L disposed at a rear part of the condenser C, having a second heat exchange medium flowing therein, and including a 2-1-th header tank 31 provided at one side in a longitudinal direction thereof; and an intercooler I disposed at a lower part of the condenser C and the second radiator L and including a 3-1-th header tank 41 disposed at one side in a longitudinal direction thereof, wherein the 2-1-th header tank 31 may has a first drain portion 50 provided at one side of the lower part of the 2-1-th header tank 31 so that the second heat exchange medium is discharged to the lower part of the 2-1-th header tank 31, and the 3-1-th header tank 41 has a second drain portion 60 provided at an outer side thereof so that the first heat exchange medium discharged from the 2-1-th header tank 31 flows to be discharged to the outside.

The first drain portion 50 may include a first outlet portion 51 that extends down to form a channel through which the first heat exchange medium is discharged and a control member 52 that controls a flow rate of the first heat exchange medium to the first outlet portion 51.

The second drain portion 60 may include: an upper guide 61 disposed at an upper part of the 3-1-th header tank 41 and including an upper rib 62 that protrudes upwardly in directions other than a rear part so that the second heat exchange medium introduced from above flows into the rear part; a side guide 65 including the side rib 64 protruding from both sides of a side of a rear part of the 3-1-th header tank 41 so that the second heat exchange medium flowing out from the rear part of the upper guide 61 flows down vertically along the side of the rear part of the 3-1-th heater tank 41; and a lower guide 68 protruding and extending backward from the lower part of the side guide 65 by a predetermined distance and having lower ribs 67 provided at both sides thereof while protruding upwardly to discharge the second heat exchange medium flowing down from the side guide 65 backward from the intercooler I while being spaced apart therefrom by a predetermined distance.

The upper guide 61 may further include an inclined part 63 positioned under the first outlet portion 51 of the first drain portion 50 and formed to be inclined by a predetermined angle to the upper surface of the 3-1-th header tank 41 to collide with the second heat exchange medium introduced upwardly to guide the second heat exchange medium backwardly.

Ribs may be continuously provided at a part where the upper rib 62 and the side rib 64 may meet each other, and ribs may be continuously provided at a part where the side rib 64 and the lower rib 67 may meet each other.

Other features and aspects will be apparent from the following detailed description, the drawings, and the claims.

DETAILED DESCRIPTION OF MAIN ELEMENTS

| | |
|---|---|
| 1: Cooling module | |
| C: Condenser | R: First radiator |
| L: Second radiator | I: Intercooler |
| 21: 1-1-th header tank | 31: 2-1-th header tank |
| 41: 3-1-th header tank | |
| 50: First drain portion | 51: First outlet portion |
| 52: Control member | |
| 60: Second drain portion | 61: Upper guide |
| 62: Upper rib | 63: Inclined part |
| 64: Side rib | 65: Side guide |
| 67: Lower rib | 68: Lower guide |
| 70: Third drain portion | 71: Inlet portion |
| 72: Outlet portion | |

DETAILED DESCRIPTION OF EMBODIMENTS

Hereinafter, a cooling module according to an exemplary embodiment of the present invention will be described in detail with reference to the accompanying drawings.

Hereinafter, a cooling module according to a first exemplary embodiment of the present invention will be described.

Figure 1:
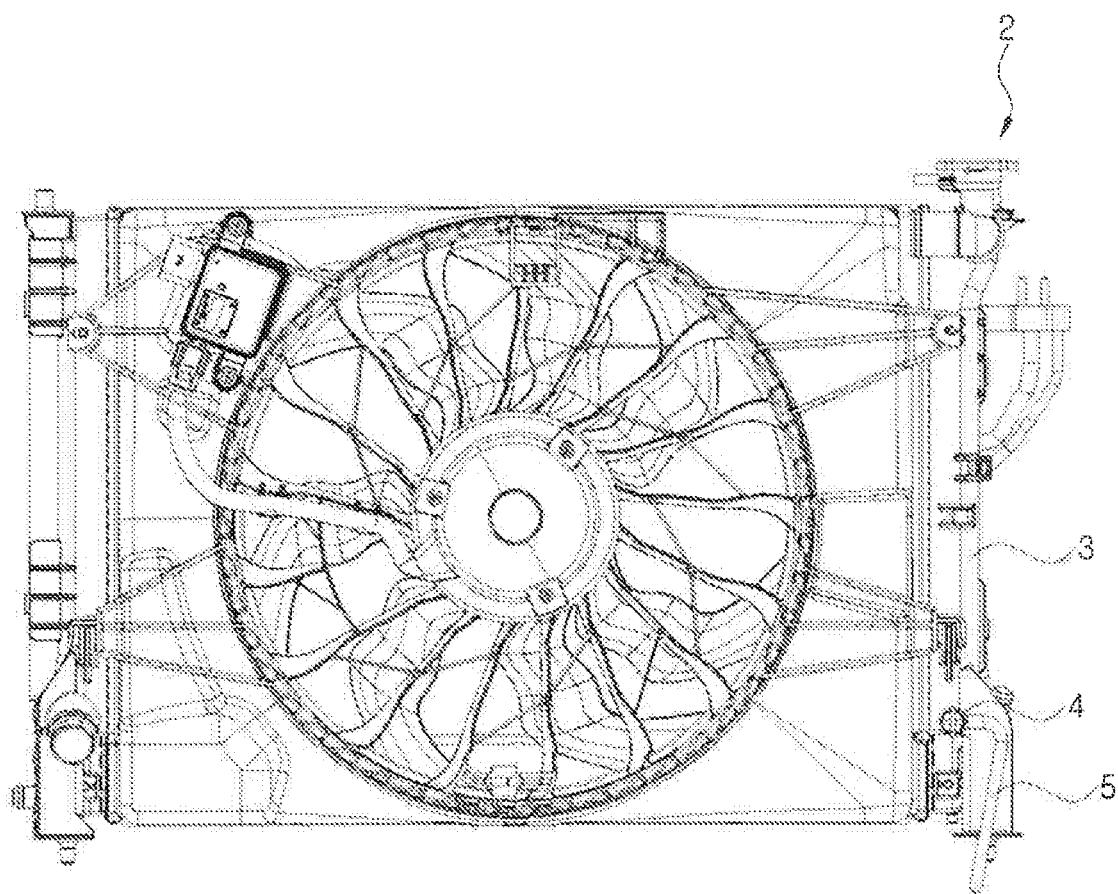
FIG. 1 is a front view of a conventional cooling module having a coolant drain hose.
Figure 2:
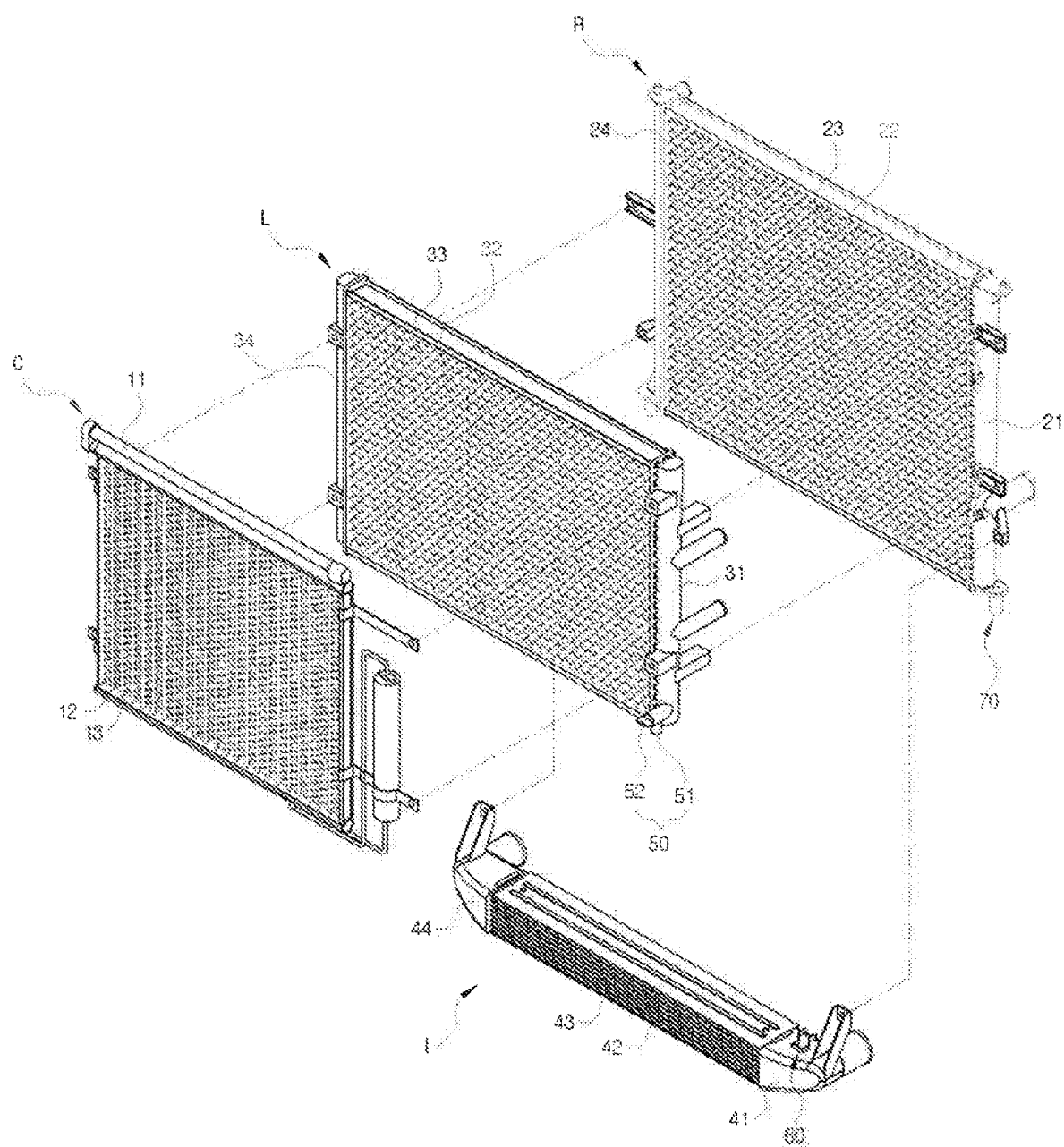
FIG. 2 is a perspective view illustrating a coupling structure of a cooling module according to an exemplary embodiment of the present invention.
Figure 3:
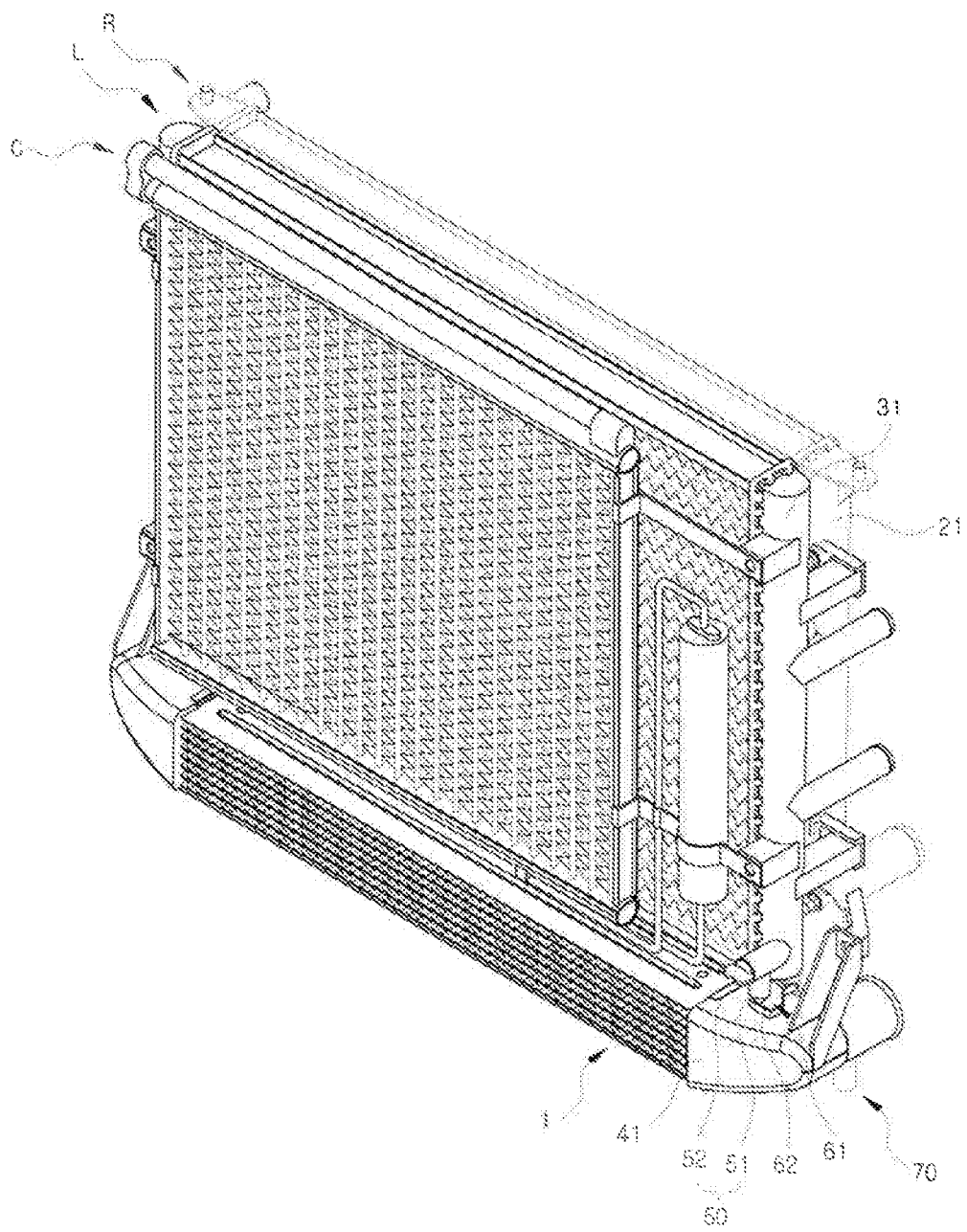
FIG. 3 is a perspective view of a cooling module according to a first exemplary embodiment of the present invention.

Referring to FIGS. 2 and 3, the cooling module mounted in front of an engine room of a vehicle includes a condenser C, a first radiator R, a second radiator L, and an intercooler I.

First, the condenser C is a heat exchanger disposed at a front part of the vehicle to condense a refrigerant flowing into an air conditioner system for the vehicle and includes a pair of condenser header tanks 11, a plurality of first tubes 12 whose both ends are fixed to the condenser header tanks 11, and a first pin 13 interposed between the first tubes 12.

In this case, the condenser header tank 11 may be a cross-flow type in which condenser header tanks are disposed in parallel to each other at a predetermined distance in a longitudinal direction, or may be a down-flow type in which condenser header tanks are disposed in parallel to each other at a predetermined distance in a height direction.

The condenser (C) exchanges heat between a refrigerant introduced into any one of the pair of condenser header tanks 11 and air while the refrigerant flows along the tube, thereby performing condensation.

Next, the first radiator R is disposed at a rear part of the condenser C in the air flow direction and has a first heat exchange medium flowing therein, and includes a 1-1-th header tank 21 disposed at one side in a longitudinal direction thereof, a 1-2-th header tank 24 disposed at the other side in a longitudinal direction thereof, a plurality of second tubes 22 having both ends fixed to the 1-1-th header tank 21 and the 1-2-th header tank 24, and a second pin 23 interposed between the second tubes 22.

At this time, like the condenser C, the first radiator R may be a cross-flow type in which the 1-1-th header tanks 21 are arranged in parallel to each other at a predetermined distance in the longitudinal direction, and may be a down-flow type in which the 1-1-th header tanks 21 are arranged in parallel to each other at a predetermined distance in a height direction.

The first radiator R may be a high-temperature radiator for cooling engine coolant.

The first radiator R performs cooling by introducing coolant for cooling the engine into either one of the pair of 1-1-th header tank 21 and 1-2-th header tank 24 and exchanging heat between the coolant and air while the coolant passes through the second tube 22.

Next, the second radiator L is disposed between the condenser C and the first radiator R in the air flow direction and has a second heat exchange medium flowing therein, and includes a 2-1-th header tank 31 disposed at one side in a longitudinal direction thereof, a 2-2-th header tank 34 disposed at the other side in a longitudinal direction thereof, a plurality of third tubes 32 having both ends fixed to the 2-1-th header tank 31 and the 2-2-th header tank 34, and a third pin 33 interposed between the third tubes 32.

The second radiator L may be a low-temperature radiator for cooling electric components.

The intercooler I is disposed at a lower part of the condenser C and the second radiator L, and includes a 3-1-th header tank 41 disposed at one side in a longitudinal direction thereof, a 3-2-th header tank 44 disposed at the other side in a longitudinal direction thereof, a plurality of fourth tubes 42 having both ends fixed to the 3-1-th header tank 41 and the 3-2-th header tank 44, and a fourth pin 43 interposed between the fourth tubes 42.

The intercooler I may be formed to be larger than a width of the condenser C and a width of the second radiator L to completely occupy a lower area of the condenser C and a lower area of the second radiator L, and may also be disposed only in the lower area of any one of the condenser C and the second radiator L.

The intercooler I may be an air-cooled intercooler or a water-cooled intercooler. In the case of the water-cooled type, the intercooler I may be a form in which a fin tube type heat exchanger is provided in a housing and or may be formed in a plate type, and therefore the shape of the intercooler I can be changed without limit.

The 2-1-th header tank 31 may be provided with a first drain portion 50 provided at one side of the lower part of the 2-1-th header tank 31 so that the second heat exchange medium is discharged to the lower part of the 2-1-th header tank 31.

The first drain portion 50 may include a first outlet portion 51 that extends down to form a channel through which the second heat exchange medium is discharged and a control member 52 that controls a flow rate of the second heat exchange medium to the first outlet portion 51.

Unlike the first radiator R capable of directly discharging the first heat exchange medium to the lower part of the vehicle through the drain portion provided at one side of the lower part of the 1-2-th header tank 24, the second radiator L has the intercooler I disposed at the lower part thereof, such that the second heat exchange medium may not be directly discharged to the lower part of the vehicle through the first outlet portion 51.

To this end, conventionally, a separate drain hose is used to discharge the second heat exchange medium to the lower part of the vehicle, which increases material cost and increases additional working time for mounting.

In order to overcome this problem, the cooling module according to the first exemplary embodiment of the present invention does not include the separate drain hose to discharge the second heat exchange medium to the lower part of the vehicle but may be configured so that the outer side of the 3-1-th header tank 41 is provided with the second drain portion 60 and a third drain portion 70 protrudes from one side of the lower part of the 1-1-th header tank 21 toward a side part to move the second heat exchange medium discharged from the 2-1-th header tank 31 to the third drain portion 70, thereby discharging the second heat exchange medium introduced through the second drain portion 60 to the lower part of the vehicle.

That is, to discharge the second heat exchange medium, separate components need not be configured but the outer surface of the 3-1-th header tank 41 of the intercooler I is provided with the second drain portion 60 to implement the shape in which the second heat exchange medium can be recovered to the lower part of the vehicle, thereby saving cost and working time and aesthetically forming the whole package.

Figure 4:
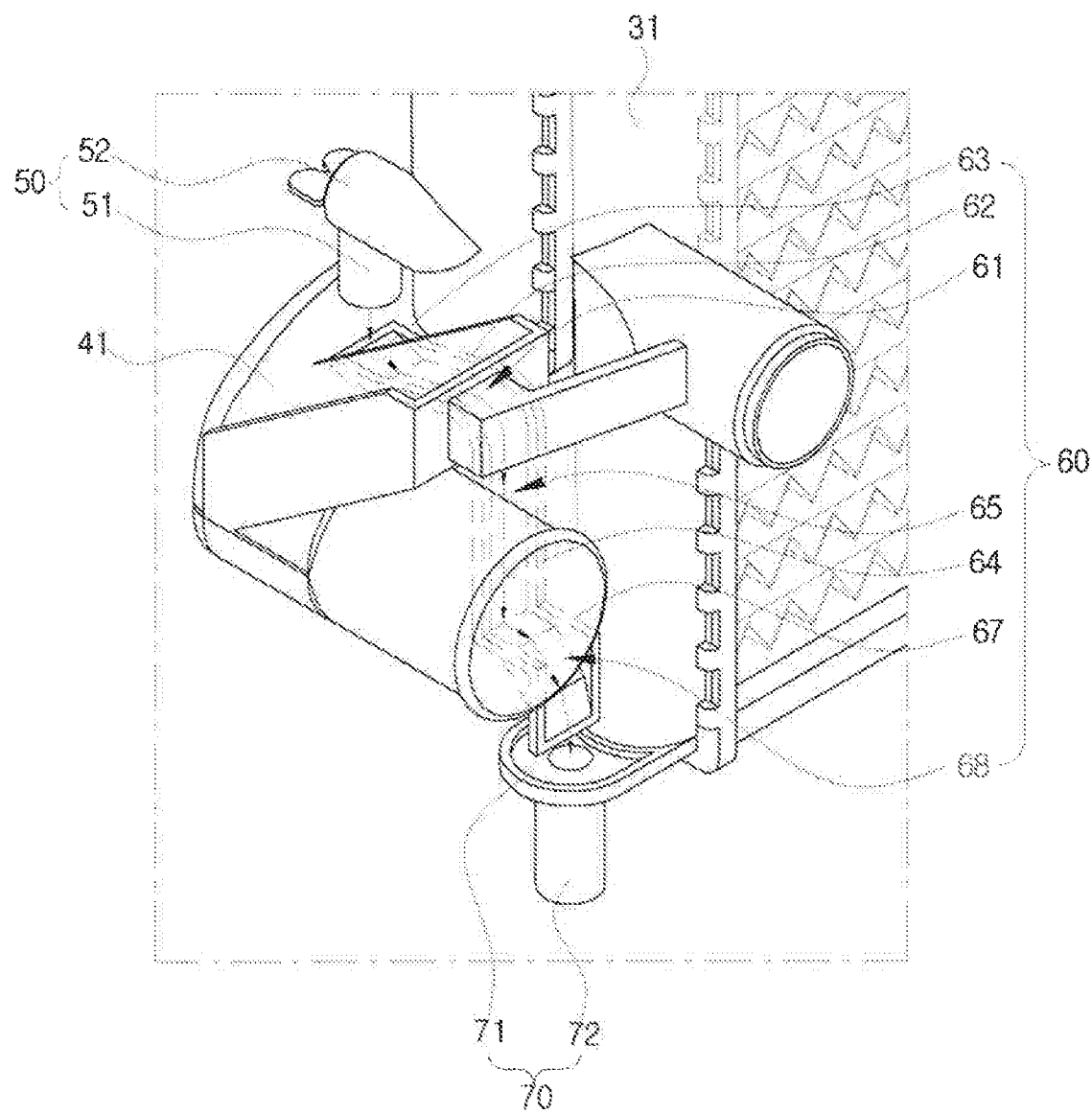
FIG. 4 is a partially enlarged view of the cooling module according to the first exemplary embodiment of the present invention.

In detail, as illustrated in FIG. 4, the second drain portion 60 may include an upper guide 61 disposed at an upper part of the 3-1-th header tank 41 and including an upper rib 62 that protrudes upwardly in directions other than a rear part so that the second heat exchange medium introduced from above flows into the rear part; a side guide 65 including the side ribs 64 protruding from both sides of a side of a rear part of the 3-1-th header tank 41 so that the second heat exchange medium flowing out from the rear part of the upper guide 61 flows down vertically along the side of the rear part of the 3-1-th heater tank 41; and a lower guide 68 extending to the third drain portion 70 while protruding backward from the lower part of the side guide 65 and having lower ribs 67 provided at both sides thereof while protruding upwardly to move the second heat exchange medium flowing down from the side guide 65 to the third drain portion 70.

That is, the second heat exchange medium discharged downwardly through the first outlet portion 51 directly drops to the upper guide 61 disposed at the lower part. The upper guide 61 includes the upper rib 62 that protrudes upwardly in directions other than the rear part, such that the second heat exchange medium dropping to the upper guide 61 moves toward the rear part at which the upper rib 62 is not provided. At this time, the upper rib 62 preferably protrudes to a sufficient height so that the second heat exchange medium dropping to the upper guide 61 does not overflow to the outside. In addition, the second heat exchange medium flowing out from the rear part at which the upper rib 62 of the upper guide 61 is not provided may flow down vertically over the side of the 3-1-th header tank 41 along the side guide 65. At this time, the second heat exchange medium moves between the side ribs 64 protruding from both sides.

In addition, the second heat exchange medium flowing down to the lower part of the side guide 65 may move to the upper part of the third drain portion 70 along the lower guide 68.

At this time, the upper rib 62, the side rib 64, and the lower rib 67 preferably protrude to a sufficient height so that the second heat exchange medium does not overflow to the outside.

In addition, ribs may be continuously provided at a part where the upper rib 62 and the side rib 64 meet each other and ribs may also be continuously provided at a part where the side rib 64 and the lower rib 67 meet each other, so that the second heat exchange medium does not leak to the outside of the second drain portion 60 while flowing.

The upper rib 62, the side rib 64, and the lower rib 67 that are provided on the outer surface of the 3-1-th header tank 41 may not only form the channel through which the second heat exchange medium moves, but also may serve as the reinforcing member that makes the 3-1-th header tank 41 structurally strong.

Further, if a surface of the upper guide 61 that meets when the second heat exchange medium drops vertically downwardly is a flat surface perpendicular to the direction in which the second heat exchange medium drops, the second heat exchange medium may overflow to the outside of the upper guide 61 when colliding with the surface of the upper guide 61. To prevent the second heat exchange medium from overflowing to the outside of the upper guide 61 and to guide the second heat exchange medium to the side guide 65 of the rear part by colliding the upper guide 61 with the second heat exchange medium introduced from above, the upper guide 61 may further include an inclined part 63 positioned under the first outlet portion 51 and formed to be inclined by a predetermined angle to the upper surface of the 3-1-th header tank 41.

Meanwhile, the intercooler I may be supported by being connected to a bracket provided in the 1-1-th header tank 21 of the first radiator R through a bracket provided in the 3-1-th header tank 41.

In addition, since the intercooler I is disposed in front of the first radiator R and a lower end of the intercooler I should be disposed above a lower end of the first radiator R in a height direction, the lower guide 68 may not further protrude backward than the first radiator R and may not further protrude downwardly than the first radiator R. Therefore, the lower guide 68 may protrude up to the upper part of the third drain portion 70 to introduce the second heat exchange medium into the third drain portion 70.

The third drain portion 70 may include a cylindrical inlet portion 71 having an opened upper part so that the first heat exchange medium is introduced from the lower guide 68; and an outlet portion 72 formed to correspond to a hole provided on the lower surface of the inlet portion 71 to discharge the second heat exchange medium downwardly.

To prevent the second exchange medium from overflowing to the outside by introducing the second exchange medium into the wide cylindrical inlet portion 71, the inlet portion 71 may have a predetermined height and the lower surface thereof may be provided with a hole through which the second heat exchange medium is discharged. At this time, the inlet portion 71 can be changed into various forms such as a box shape having a predetermined height so that the second heat exchange medium introduced through the opened upper part thereof does not overflow to the outside.

In addition, the outlet portion has a narrower cylindrical shape than the inlet portion 71 to correspond to the hole provided on the lower surface of the inlet portion 71 to discharge the second heat exchange medium to the desired position of the lower part of the vehicle.

Hereinafter, a cooling module according to a second exemplary embodiment of the present invention will be described.

The cooling module according to the second exemplary embodiment of the present invention refers to the cooling module not including the first radiator of the first exemplary embodiment. Hereinafter, the components not specifically mentioned are the same as those described in the first exemplary embodiment.

Figure 5:
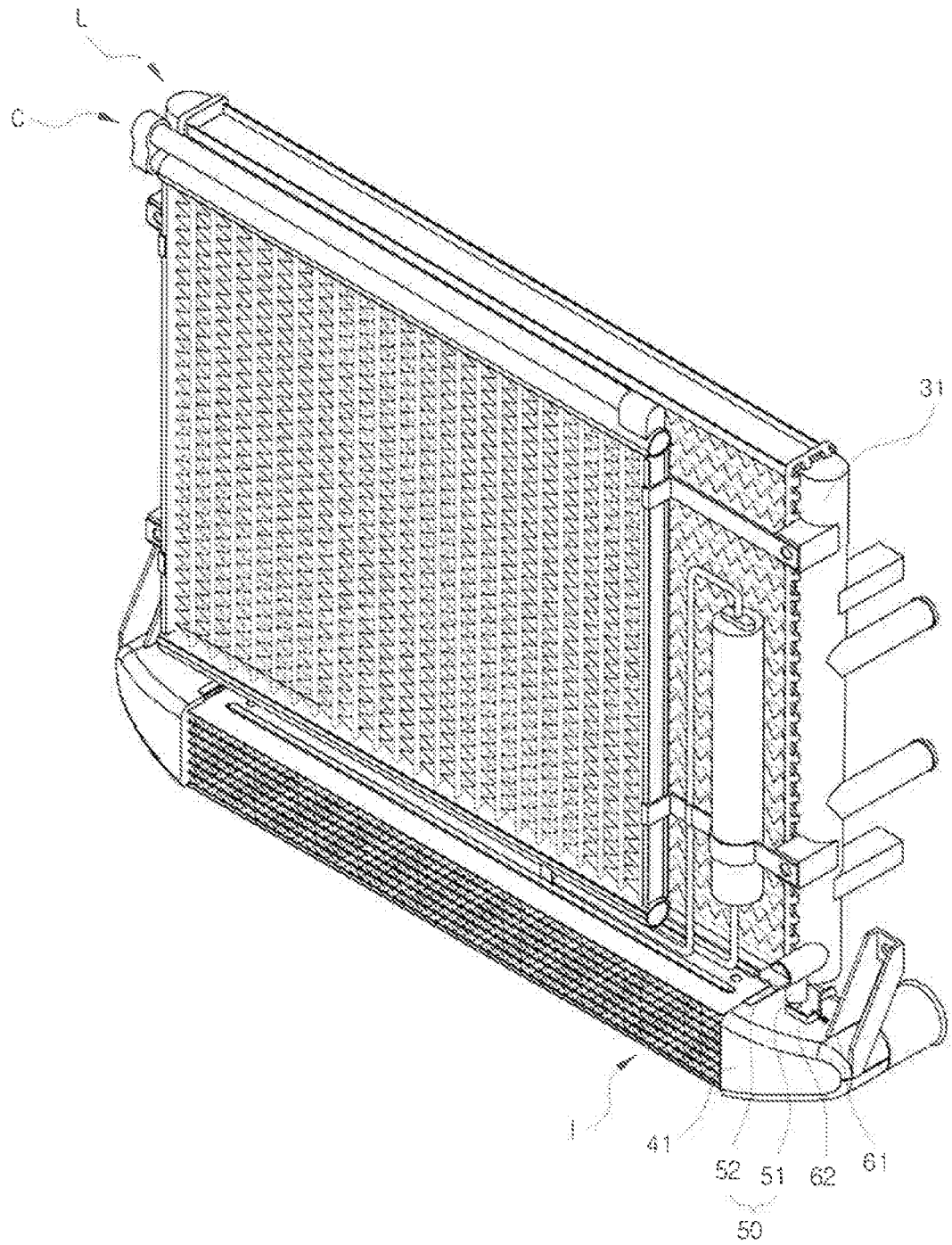
FIG. 5 is a perspective view of a cooling module according to a second exemplary embodiment of the present invention.

Therefore, as illustrated in FIGS. 2 and 5, the cooling module 1 includes a condenser C, a second radiator L, and an intercooler 1.

The second radiator L may be a high-temperature radiator for cooling engine coolant and a low-temperature radiator for cooling electric components.

The intercooler I may be a low-temperature radiator instead of an intercooler.

Specifically, the cooling module according to the second exemplary embodiment of the present invention includes a condenser C disposed at a front part of a vehicle to condense a refrigerant flowing into an air conditioner system for the vehicle; a second radiator L disposed at a rear part of the condenser C, having a second heat exchange medium flowing therein, and including a 2-1-th header tank 31 disposed at one side in a longitudinal direction thereof; and an intercooler 1 disposed at a lower part of the condenser C and the second radiator L and including a 3-1-th header tank 41 disposed at one side in a longitudinal direction thereof.

In this case, the cooling module does not include a separate drain hose to discharge the second heat exchange medium to the lower part of the vehicle, but the 2-1-th header tank includes a first drain portion 50 provided at one side of a lower part of the 2-1-th header tank 31 so that the first heat exchange medium discharges the first heat exchange medium to an upper part of the 2-1-th header tank 31 and a second drain portion 60 provided at an outer side of the 3-1-th header tank 41 so that the first heat exchange medium discharged from the 2-1-th header tank 31 flows to be discharged to the outside.

That is, to discharge the second heat exchange medium, separate components need not be configured but the outer surface of the 3-1-th header tank 41 of the intercooler I is provided with the second drain portion 60 to implement the shape in which the second heat exchange medium can be recovered to the lower part of the vehicle, thereby saving cost and working time and aesthetically forming the whole package.

Figure 6:
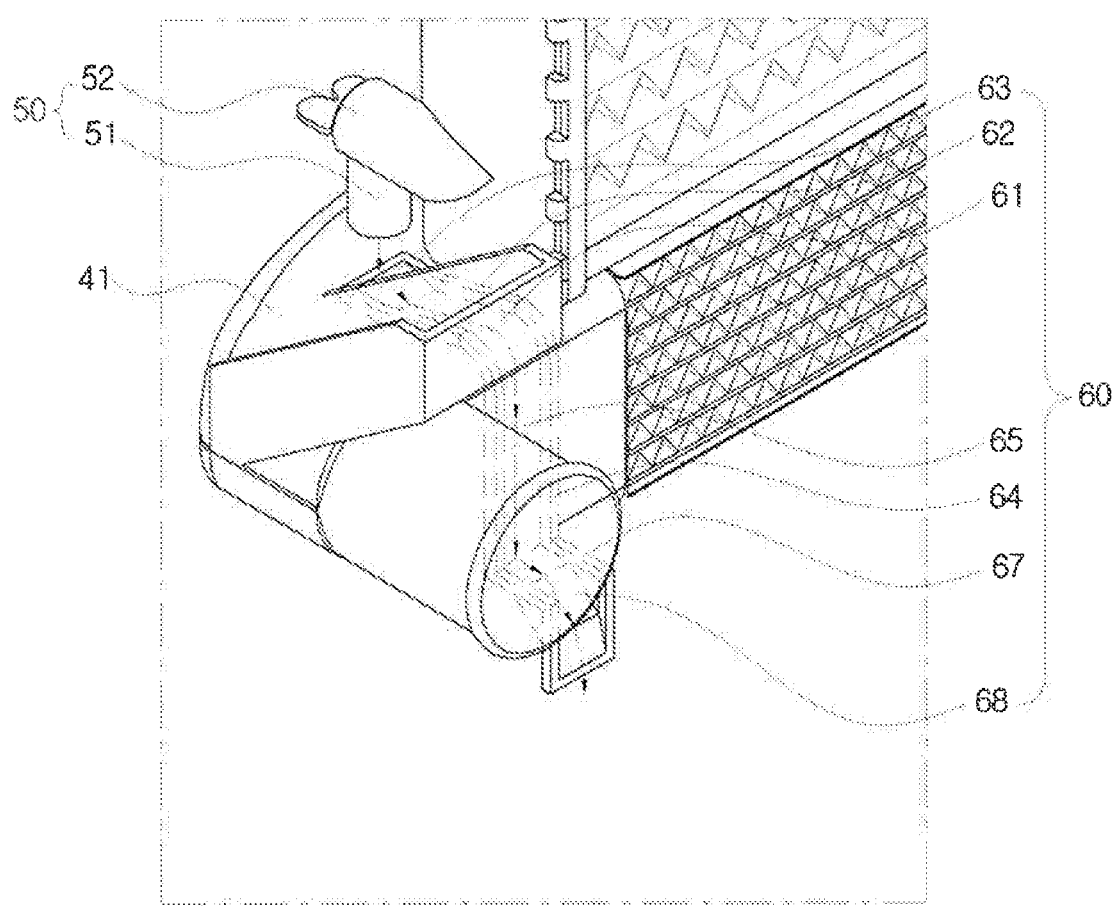
FIG. 6 is a partially enlarged view of the cooling module according to the second exemplary embodiment of the present invention.

In detail, as illustrated in FIG. 6, the second drain portion 60 may include an upper guide 61 disposed at an upper part of the 3-1-th header tank 41 and including an upper rib 62 that protrudes upwardly in directions other than a rear part so that the second heat exchange medium introduced from above flows into the rear part; a side guide 65 including the side ribs 64 protruding from both sides of a side of a rear part of the 3-1-th header tank 41 so that the second heat exchange medium flowing out from the rear part of the upper guide 61 flows down vertically along the side of the rear part of the 3-1-th heater tank 41; and a lower guide 68 protruding and extending backward from the lower part of the side guide 65 by a predetermined distance and having lower ribs 67 provided at both sides thereof while protruding upwardly to discharge the second heat exchange medium flowing down from the side guide 65 backward from the intercooler I while being spaced apart therefrom by a predetermined distance.

That is, the second heat exchange medium discharged downwardly through the first outlet portion 51 directly drops to the upper guide 61 disposed at the lower part. The upper guide 61 includes the upper rib 62 that protrudes upwardly in directions other than the rear part, such that the second heat exchange medium dropping to the upper guide 61 moves toward the rear part at which the upper rib 62 is not provided. At this time, the upper rib 62 preferably protrudes to a sufficient height so that the second heat exchange medium dropping to the upper guide 61 does not overflow to the outside. The same is applied to the side rib 64 and the lower rib 67 to be described later.

In addition, the second heat exchange medium flowing out from the rear part at which the upper rib 62 of the upper guide 61 is not provided may flow down vertically over the side of the 3-1-th header tank 41 along the side guide 65. At this time, the second heat exchange medium moves between the side ribs 64 protruding from both sides.

The second heat exchange medium flowing down to the lower side of the side guide 65 moves along the lower guide 68 protruding from the side guide 65 to be discharged from a place spaced apart by a predetermined distance backward from the intercooler I toward the lower part of the vehicle and is discharged from the end of the lower guide 68 toward the lower part of the vehicle.

An end of the lower guide 68 may be bent in a '¬'-letter form so that the second heat exchange medium can well flow down vertically.

Therefore, the cooling module 1 according to the present invention includes the second drain portion 60 provided on an outer surface of a 3-1-th header tank 41 of the intercooler I without including separate components for discharging the second heat exchange medium to retrieve the second heat exchange medium to the lower part of the vehicle, thereby saving cost and working time and serving to reinforce the 3-1-th header tank 41.

According to the cooling module of the exemplary embodiment of the present invention, the shape in which the second drain portion 60 is provided on the outer surface of the 3-1-th header tank 41 of the intercooler I, and the third drain portion 70 is provided on one side of the lower part of the 1-1-th header tank 21 to recover the second heat exchange medium to the lower part of the vehicle is improved, thereby saving the cost and the working time and aesthetically forming the whole package.

In addition, the upper rib 62, the side rib 64, and the lower rib 67 that are provided on the outer surface of the 3-1-th header tank 41 not only form the channel through which the second heat exchange medium moves, but also serve as the reinforcing member that makes the 3-1-th header tank 41 structurally strong.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A cooling module, comprising:
    a condenser disposed at a front part of a vehicle and condensing a refrigerant flowing into an air conditioner system for the vehicle;
    a first radiator disposed at a rear part of the condenser, having a first heat exchange medium flowing therein, and including a 1-1-th header tank provided at one side in a longitudinal direction thereof;
    a second radiator disposed between the condenser and the first radiator, having a second heat exchange medium flowing therein, and including a 2-1-th header tank provided at one side in a longitudinal direction thereof; and
    an intercooler including a third 3-1-th header tank disposed under the second radiator and formed at one side in a longitudinal direction thereof at a position corresponding to the 2-1-th header tank,
    wherein the 2-1-th header tank includes a first drain portion formed at one side of a lower part of the 2-1-th header tank so that the second heat exchange medium is discharged to the lower part of the 2-1-th header tank,
    the third 3-1-th header tank is provided with a channel on an outer side thereof so that the second heat exchange medium discharged from the 2-1-th header tank first drain portion is discharged to the lower part downwardly, and
    the channel includes: a second drain portion formed on the 3-1-th header tank, with an upstream end formed under the first drain portion and a downstream end formed toward a rear part of the 3-1-th header tank, to discharge the second heat exchange medium discharged from the 2-1-th header tank to the lower part downwardly; and a third drain portion protruding to a side part from one side of the a lower part of the 1-1-th header tank and formed under the downstream end of the second drain portion to discharge the second heat exchange medium introduced through the second drain portion to the lower part downwardly.

2. The cooling module of claim 1, wherein the first drain portion includes a first outlet portion that extends down to form a channel through which the second heat exchange medium is discharged and a control member that controls a flow rate of the second heat exchange medium to the first outlet portion.

3. The cooling module of claim 1, wherein the second drain portion includes:
    an upper rib that protrudes upwardly from parts of the upper guide disposed at an upper part of the 3-1-th header tank and including an upper rib that protrudes upwardly from parts of the upper guide other than a rear part so that the second heat exchange medium introduced from above flows into the rear part;
    a side guide including a side rib protruding from both sides of a side of a rear part of the 3-1-th header tank so that the second heat exchange medium flowing out from the rear part of the upper guide flows down vertically along the side of the rear part of the 3-1-th heater tank; and
    a lower guide extending to the third drain portion while protruding backward from a lower part of the side guide and having lower ribs provided at both sides thereof while protruding upwardly to move the second heat exchange medium flowing down from the side guide to the third drain portion.

4. The cooling module of claim 3, wherein the upper rib, the side rib, and the lower rib are formed together as a single continuous rib extending from the upper guide to a side guide and from the side guide to a lower guide at a part where the side rib and the lower rib meet each other.

5. The cooling module of claim 3, wherein the third drain portion includes:
    a cylindrical inlet portion having an opened upper part so that the second heat exchange medium is introduced from the lower guide; and
    an outlet portion having opened upper and lower parts and formed to correspond to a hole provided on a lower surface of the inlet portion to discharge the second heat exchange medium downwardly.

6. The cooling module of claim 1, wherein the upper guide includes an inclined part positioned under a first outlet portion of the first drain portion and formed to be inclined by a predetermined angle to an upper surface of the 3-1-th header tank to collide with the second heat exchange medium introduced from above to guide the second heat exchange medium backwardly.

7. The cooling module of claim 1, wherein the first drain portion includes a first outlet portion that extends down to form a channel through which the second heat exchange medium is discharged and a control member that controls a flow rate of the second heat exchange medium to the first outlet portion.

8. The cooling module of claim 1, wherein the second drain portion includes:
an upper rib that protrudes upwardly from parts of the upper guide other than a rear part so that the second heat exchange medium introduced from above flows into the rear part;
a side guide including a side rib protruding from both sides of a side of a rear part of the 3-1-th header tank so that the second heat exchange medium flowing out from the rear part of the upper guide flows down vertically along the side of the rear part of the 3-1-th heater tank; and
a lower guide protruding and extending backward from a lower part of the side guide by a predetermined distance and having lower ribs provided at both sides thereof while protruding upwardly to discharge the second heat exchange medium flowing down from the side guide backward from the intercooler while being spaced apart therefrom by a predetermined distance.

9. The cooling module of claim 1, wherein the upper guide further includes an inclined part positioned under the first outlet portion of the first drain portion and formed to be inclined by a predetermined angle to the upper surface of the 3-1-th header tank to collide with the second heat exchange medium introduced upwardly to guide the second heat exchange medium backwardly.

10. The cooling module of claim 1, wherein the upper rib, the side rib, and the lower rib are formed together as a single continuous rib extending from the upper guide to the side guide and from the side guide to the lower guide at a part where the side rib and the lower rib meet each other.

11. A cooling module, comprising:
a condenser disposed at a front part of a vehicle and condensing a refrigerant flowing into an air conditioner system for the vehicle;
a radiator disposed at a rear part of the condenser, having a heat exchange medium flowing therein, and including a 2-1-th header tank provided at one side in a longitudinal direction thereof;
an intercooler disposed under the radiator and including a 3-1-th header tank formed at one side in a longitudinal direction thereof at a position corresponding to the 2-1-th header tank;
a first drain portion provided at one side of a lower part of the 2-1-th header tank so that the heat exchange medium is discharged to the lower part of the 2-1-th header tank; and
a second drain portion protruding outwardly from the 3-1-th header tank so that the heat exchange medium discharged from the first drain portion is discharged downwardly,
wherein the second drain portion includes:
an upper guide disposed at an upper part of the 3-1-th header tank and including upper ribs that protrude upwardly in directions other than a rear part so that the heat exchange medium introduced from above flows into the rear part;
a side guide including side ribs protruding from both sides of a side of a rear part of the 3-1-th header tank so that the heat exchange medium flowing out from the rear part of the upper guide flows down vertically along the side of the rear part of the 3-1-th heater tank; and
a lower guide protruding and extending backwardly from a lower part of the side guide by a predetermined distance and having lower ribs provided at both sides thereof while protruding upwardly to discharge the heat exchange medium flowing down from the side guide backwardly from the intercooler while being spaced apart therefrom by a predetermined distance, and
the lower guide has an end portion bent downwardly to be formed along a vertical direction.

* * * * *